United States Patent [19]
Itoh

[11] Patent Number: 5,543,984
[45] Date of Patent: Aug. 6, 1996

[54] DISK DRIVE WITH FLUID BEARING, BEARING PLATE AND DISK-MOVING MECHANISM

[75] Inventor: Jun Itoh, Yokohama, Japan

[73] Assignee: Kabushiki Kaisha Toshiba, Kawasaki, Japan

[21] Appl. No.: 535,478

[22] Filed: Sep. 28, 1995

Related U.S. Application Data

[63] Continuation of Ser. No. 156,895, Nov. 24, 1993, abandoned.

[30] Foreign Application Priority Data

Nov. 26, 1992 [JP] Japan ................................. 4-316705
Nov. 24, 1993 [JP] Japan ................................. 5-293267

[51] Int. Cl.$^6$ .................... G11B 17/035; G11B 17/32; G11B 25/04
[52] U.S. Cl. ................... 360/99.09; 360/97.01; 360/102
[58] Field of Search ................ 360/103, 102, 360/97.01, 97.02, 99.08, 99.09, 99.06, 133, 137; 369/263, 264, 258

[56] References Cited

U.S. PATENT DOCUMENTS

| | | | |
|---|---|---|---|
| 4,636,891 | 1/1987 | Barski | 360/97.02 |
| 4,658,944 | 4/1987 | Kogure et al. | 360/99.09 |
| 5,060,101 | 10/1991 | Isomura | 360/99.06 |
| 5,182,739 | 1/1993 | Kime et al. | 369/44.15 |

FOREIGN PATENT DOCUMENTS 03-069060 3/1991 Japan.
04-289577 10/1992 Japan.

Primary Examiner—Stuart S. Levy
Assistant Examiner—Craig A. Renner
Attorney, Agent, or Firm—Oblon, Spivak, McClelland, Maier & Neustadt P.C.

[57] ABSTRACT

A disk drive apparatus having a fluid bearing, an enclosure, a fixed shaft, a hub, a working fluid, spiral grooves, a disk, a head, and an axial-gap three-phase brushless motor. The shaft has two ends and a peripheral surface. The hub has a first inner surface opposing one end of the shaft and a second inner surface surrounding the peripheral surface of the shaft, and is designed to float with respect to the shaft by virtue of a fluid pressure. The working fluid is provided in a gap between the one end of the shaft and peripheral surface of the shaft, on the one hand, and the inner surfaces of a cup-shaped member, on the other hand. The spiral grooves are formed in at least one of the peripheral surface of the shaft and the first inner surface of the cup-shaped member. A bearing plate lies opposite the disk at a distance while stationary. When the disk moves, the distance between the disk and bearing plate decreases in order to generate fluid pressure.

11 Claims, 12 Drawing Sheets

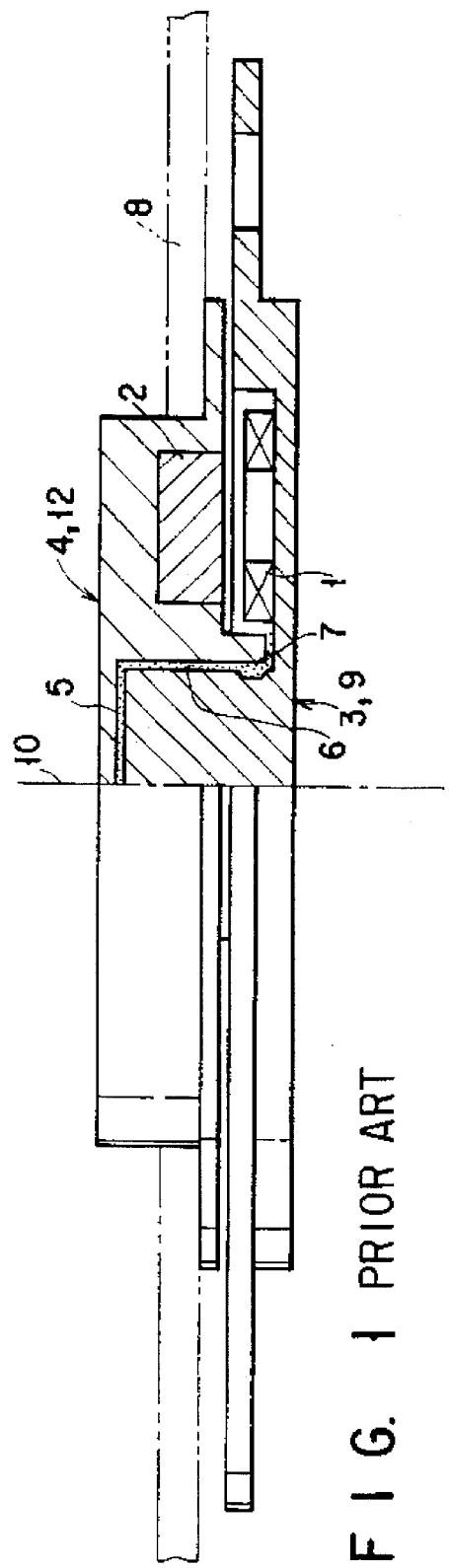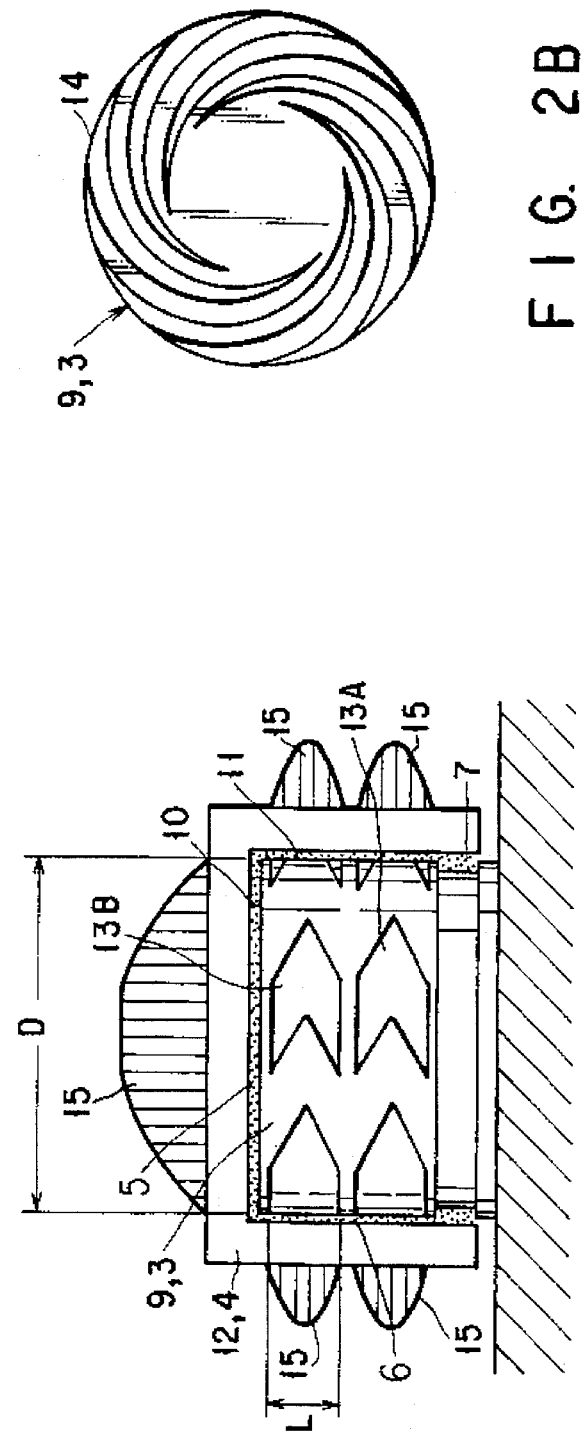

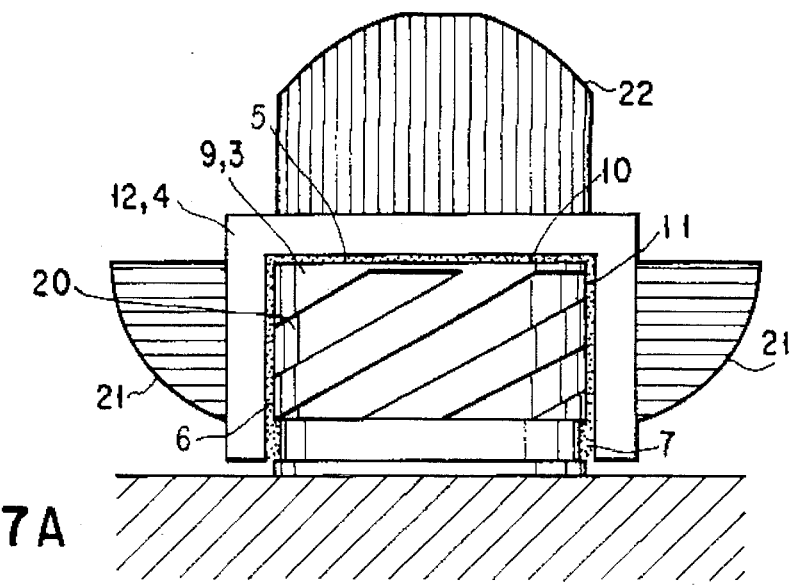
F I G. 7A
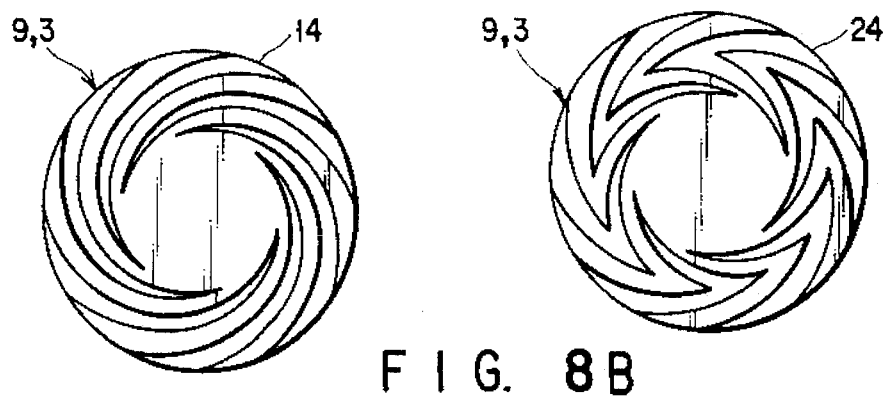
F I G. 7B    F I G. 8B
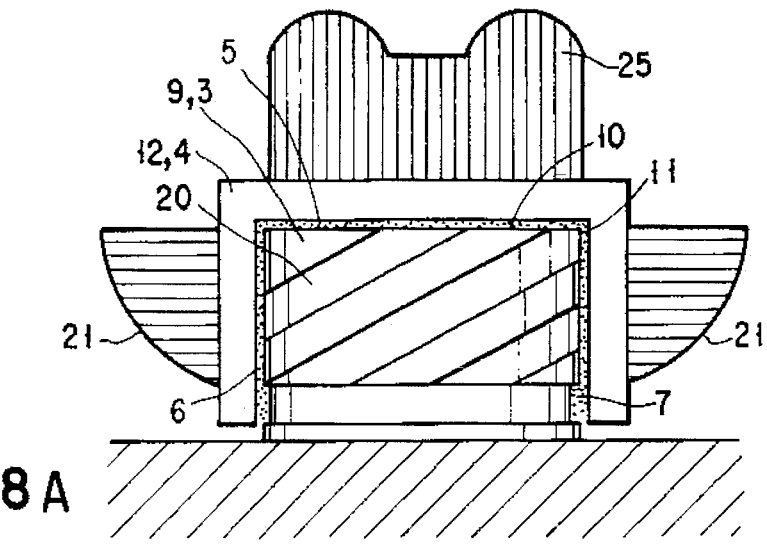
F I G. 8A

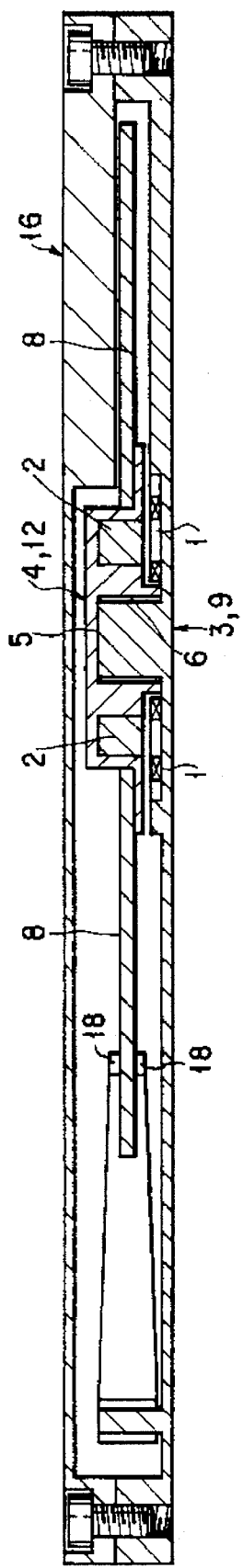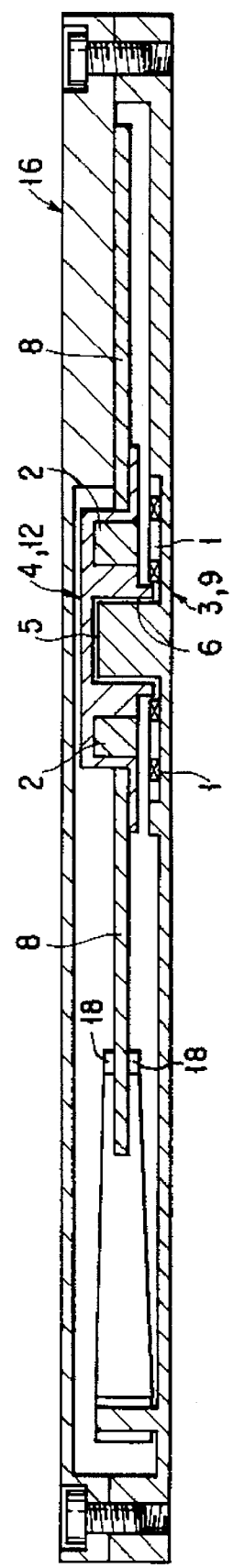
FIG. 9A
FIG. 9B

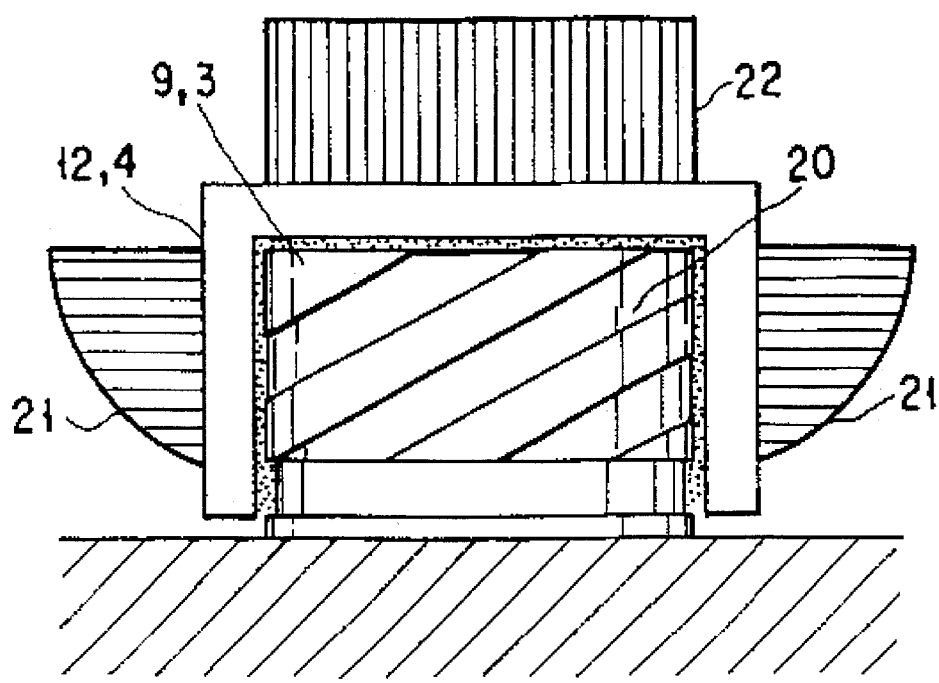
F I G. 10A
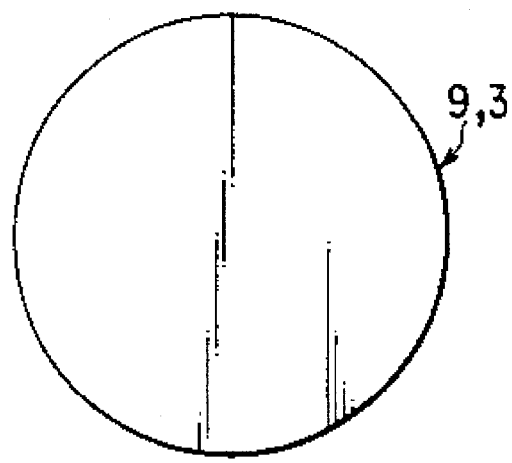
F I G. 10B

DISK DRIVE WITH FLUID BEARING, BEARING PLATE AND DISK-MOVING MECHANISM This application is a continuation of application Ser. No. 08/156,895, filed on Nov. 24, 1993, now abandoned.

BACKGROUND OF THE INVENTION

1. Field of the Invention

The present invention relates to a fluid bearing device and also to a disk drive apparatus having the fluid bearing device.

2. Description of the Related Art

A laser printer has a motor for rotating a polygon mirror. A video cassette recorder (VCR) has a motor for rotating a head drum. A disk drive (a magnetic disk drive, an optical disk drive, or an optomagnetic disk drive) has a motor for rotating a disk (a magnetic disk, an optical disk, or an optomagnetic disk). The motor is one of the most important components of any one of these information apparatuses. It is desired that a rotary machine (e.g., an electric motor) for use in information apparatuses be machined with high precision and have high impact resistance.

Ball bearings have hitherto been used in the rotary machines incorporated in information apparatuses. The balls and/or race of a ball bearing used in a rotary machine will be damaged when it receives an impact. In this case, the shaft supported by the bearing will incline while being driven.

The recent notable trend is the miniaturization of information apparatuses. It is demanded that disk drives, among other things, be made thinner to be more portable. Very thin electric motors for use in disk drives should therefore be developed. An electric motor, the shaft of which is supported by a ball, cannot be made as thin as is desired, because of the structural configuration of the ball bearing.

A fluid bearing is now replacing a ball bearing in the rotary machine incorporated in an information apparatus. The fluid bearing comprises a fixed section and a rotary section. These sections are spaced part, defining a gap. The gap is filled with working fluid such as lubricating oil or air. The surface of at least one of the sections, which opposes the other section, has a groove for guiding the working fluid in a predetermined direction. As the fluid flows in that direction, guided by the groove, dynamic pressure is built up in the gap between the fixed section and the rotary section. The dynamic pressure thus generated holds the rotary section in a prescribed position.

A fluid bearing is regarded as advantageous over a ball bearing in three respects. First, it is less liable to undergo rotational vibration. Second, it is more resistant to impact. Third, it can be designed to be thinner.

FIG. 1 schematically shows a disk drive having an electric motor which incorporates a conventional fluid bearing. As can be seen from FIG. 1, the motor is a so-called "axial-gap type" brushless motor. It comprises a multi-phase armature coil 1 and a permanent magnet 2 which oppose each other. The coil 1 and the magnet 2 are the main components of a brushless motor. The fluid bearing comprises a fixed section 3 (or a shaft 9) and a rotary section 4 (or a cup-shaped member 12). The sections 3 and 4 are spaced apart, defining a thrust bearing gap 5 and a radial bearing gap 6 between them. Both gaps 5 and 6 are filled with working fluid 7 such as lubricating oil or air. A disk 8 is mounted on the rotary section 4 and can be rotated as the section 4 is driven by the electric motor.

FIGS. 2A and 2B show a conventional fluid bearing. As is seen from FIG. 2A, the bearing body includes a shaft 9 (or a fixed section 3) and a cup-shaped member 12 (or a rotary section 4). The cup-shaped member 12 accommodates the shaft 9 such that the thrust bearing surface 10 and axial bearing surface 11 of the shaft 9 are spaced apart from the inner surfaces of the member 2 by predetermined distances, thus forming a thrust bearing gap 5 and a radial bearing gap 6. Both gaps 5 and 6 are filled with working fluid 7. Herringbone grooves 13A and 13B are formed in the radial bearing surface 11 and arranged in two rows, all around the circumference thereof. Each of the herringbone grooves 3A and 13B is generally v-shaped and oriented to the direction in which the shaft 9 rotates. Hence, when the shaft 9 rotates, the working fluid 7 is forced toward the tips of the herringbone grooves 13A and 13B, thus generating a pressure. The pressure imparts radial rigidity to the shaft 9. The pressure also prevents the shaft 9 from inclining, provided that the rows of the herringbone grooves are spaced apart by an appropriate distance.

As shown in FIG. 2B, spiral grooves 14 are formed in the thrust bearing surface 10. When the shaft 9 rotates, the spiral grooves 14 make the working fluid 7 to flow in such a direction that build a thrust load 10 capacitance which causes the shaft 9 to float, overcoming the attraction of the permanent magnet of the axial-gap type motor.

The pressure distributes in the radial and thrust directions of the fluid bearing as indicated by shaded region 15 in FIG. 2A.

The fluid bearing shown in FIGS. 2A and 2B has two problems if it thin enough to be incorporated into an axial-gap type motor. The first problem is that its thrust bearing surface 10, which is proportionally small, may fail to provide a thrust load capacitance great enough to float the rotary section 4 against the attraction of the permanent magnet of the motor. The second problem is that its radial rigidity is insufficient since the grooves made in the radial bearing surface 11 have but a small width L.

FIG. 3 is a diagram illustrating how the radial rigidity of the conventional fluid bearing change with dimensionless quantity L/D, where L is the width of the herringbone grooves 13 and D is the diameter of the shaft 9. As is evident from FIG. 3, when L/D reduces to half the initial value, the radial rigidity decreases a quarter or less the initial value. The radial rigidity is a primary factor of the motor incorporating the fluid bearing, which influences the impact resistance of the disk drive apparatus incorporating the motor. Without decreasing the radial rigidity, it is difficult to make the motor sufficiently thin by the existing technology of manufacturing the axial-gap motors.

As has been indicated, a relatively thin conventional fluid bearing for use in an axial-gap electric motor has two inherent problems. First, since the bearing is made thin, it has no thrust load capacitance large enough to float the rotary section against the attraction of the permanent magnet of the motor. Second, since the herringbone grooves made in the radial bearing surface are narrow, the bearing has but an insufficient radial rigidity.

A fluid bearing of a different type, which is suitable for use in a disk drive apparatus, is disclosed in Jpn. Pat. Appln. KOKAI Publication No. 4-289577 (hereinafter referred to as "Publication"). In this fluid bearing, a dynamic pressure is generated in the gap between the disk and the enclosure, due to the air flowing through the gap as the disk rotates. The dynamic pressure prevents the disk from inclining to the shaft and provides thrust rigidity. Also, a dynamic pressure is generated also in the gap between the outer circumference of the disk and the enclosure as the disk rotates. This dynamic pressure provides radial rigidity.

Generally, a fluid bearing has but a very low rigidity when made small. To increase the rigidity to a sufficient value, it is necessary to reduce the gap between the rotary and the fixed sections or to increase the viscosity of the working fluid. To reduce the gap it is required that the opposing surfaces of the rotary and the fixed sections be machined with high precision. When the viscosity of the working fluid is increased, the shaft loss will increase, raising power consumption. Hence, in the case where a fluid bearing is incorporated in a disk drive apparatus, it is important that the bearing has as large a bearing area as the space in the apparatus permits. In view of this, the technique of using the disk as bearing surface, as in the bearing disclosed in the Publication, is a good method of proving thrust rigidity and preventing the disk from inclining to the shaft.

The fluid bearing disclosed in the Publication is disadvantageous, however, in the following two respects.

First, the bearing has but small radial rigidity. As indicated, generally a fluid bearing has but a very low rigidity if its bearing surface is narrow (see FIG. 3). In the fluid bearing disclosed in the Publication, the width of the bearing surface is the thickness of the disk. To increase the radial rigidity, the disk must be replaced by a thicker one. The thicker the disk, the longer the time which the disk requires to reach a desired speed and the larger the space which accommodates the disk. Thus, the disk cannot be replaced by a thicker one. Rather, it is desirable that the disk be thinner so that the apparatus may be smaller. In practice it is difficult for the fluid bearing to acquire a sufficient radial rigidity.

Secondly, there is the possibility that the disk contacts the enclosure when the motor is started or stopped. To provide a sufficient thrust rigidity and to reliably prevent the disk from inclining to the shaft, the gap between the disk and the enclosure must be as narrow as possible. If the gap is too narrow, the disk may contact the enclosure as the motor is started or stopped, rotating the disk at a low speed. Rotated at low speeds, the disk vibrates and may contact the enclosure. If this happens, the recording surface of the disk is damaged, inevitably destroying the information recorded on the recording surface. To avoid such destruction of information, that surface of the disk which is used as bearing surface is not used as a recording surface and no recording/reproducing head is located at that surface of the disk. Consequently, even if the disk drive apparatus has two disks, only two disk surfaces contribute to recording, which is disadvantageous from a viewpoint of information-recording density. Furthermore, if the disk contacts the enclosure, its surface will be scratched, unavoidably forming dust. Both the damaged surface and the dust will jeopardize the recording/reproducing operation of the disk drive.

SUMMARY OF THE INVENTION

The first object of the present invention is to provide a fluid bearing device which has a thrust load capacitance large enough for use in an axial-gap motor, which has yet an adequate radial rigidity, and which can therefore help to manufacture a very thin electric motor.

The second object of the invention is to provide a disk drive apparatus which has a high-precision, impact-resistant fluid bearing and which is both small and thin.

To attain the first object, according to this invention there is provided a fluid bearing device comprising:

a shaft having first and second end faces and a peripheral surface;

a cup-shaped member having a first inner surface opposing at least the first end face of the shaft, and a second inner surface surrounding the peripheral surface of the shaft, and designed to float with respect to the shaft by virtue of a fluid pressure;

a working fluid provided in a gap between the first end face of the shaft and the peripheral surface of the shaft, on the one hand, and the first and second inner surfaces of the cup-shaped member, on the other hand; and grooves formed in at least one of the peripheral surface of the shaft or at least one of the inner surfaces of the cup-shaped member, for forcibly guiding the working fluid toward the first end face of the shaft along the peripheral surface thereof as the shaft and the cup-shaped member rotate relative to each other.

To achieve the second object, according to the invention there is provided a disk drive apparatus having a fluid bearing, comprising:

a disk which is an information recording medium;

a recording/reproducing head for recording information on the disk and reproducing the data from the disk;

disk-rotating and -positioning means supporting the disk in rotatably fashion, for rotating the disk and moving the disk in a direction substantially perpendicular to a surface of the disk; and a bearing plate to oppose the surface of the disk and spaced apart therefrom by a predetermined distance while the disk is rotating.

To attain the second object, according to this invention there is provided a disk drive apparatus having a fluid bearing, comprising:

a disk which is an information recording medium;

a recording/reproducing head for recording information on the disk and reproducing the data from the disk;

disk-rotating means supporting the disk in rotatable fashion and designed to rotate the disk;

a disk-positioning mechanism for moving the disk in a direction substantially perpendicular to a surface of the disk; and a bearing plate to oppose the surface of the disk and spaced apart therefrom by a predetermined distance while the disk is rotating.

To attain the second object, as well, therein provided a disk drive apparatus having a fluid bearing, comprising:

a disk which is an information recording medium;

a recording/reproducing head for recording information on the disk and reproducing the data from the disk;

disk-rotating means supporting the disk in rotatable fashion and designed to rotate the disk; and a bearing plate to oppose the surface of the disk and spaced apart therefrom by a distance which increases toward an outer circumference of the disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a sectional view schematically showing a disk drive having an electric motor which incorporates a conventional fluid bearing;

FIGS. 2A and 2B are a front view and a plan view, respectively, showing a conventional fluid bearing;

FIGS. 7A and 7B are views schematically showing a fluid bearing which is a third embodiment of the present invention;

FIGS. 8A and 8B are views schematically showing a fluid bearing which is a fourth embodiment of this invention;

FIGS. 9A and 9B are sectional views of A disk drive which is a fifth embodiment of the present invention, fluid bearing, showing the state the bearing assumes while the disk drive is not operating, and the state the bearing assumes while the disk drive is operating;

FIGS. 10A and 10B are diagrams for explaining the disk-positioning mechanism incorporated in the disk drive;

DETAILED DESCRIPTION OF THE PREFERRED EMBODIMENTS

Preferred embodiments of the present invention will be described in detail, with reference to FIGS. 4A and 4B to FIG. 18. In these figures, the identical reference numbers denote the same or similar components of these embodiment, which will not be described if once explained in detail.

The reference to FIGS. 4A and 4B and FIGS. 5A to 5C, there will be described a first embodiment of the invention which is a fluid bearing.

Figure 4A:
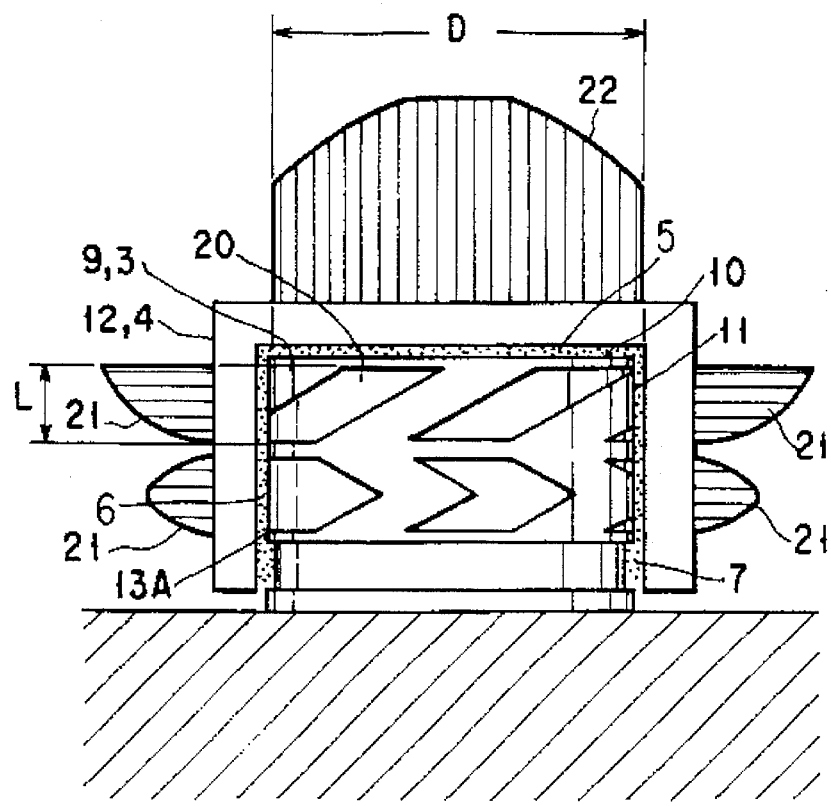
FIGS. 4A and 4B are a front view and a plan view, showing a fluid bearing which is a first embodiment of the present invention.
Figure 4B:
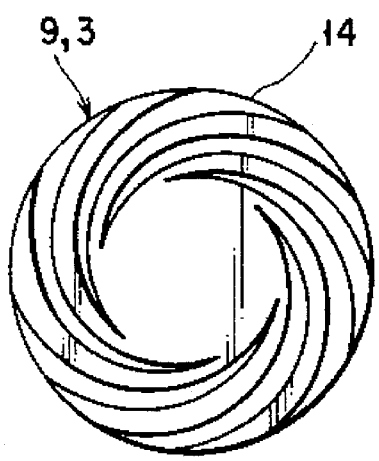

As shown in FIG. 4A, the fluid bearing comprises a shaft 9 (or a fixed section 3). The shaft 9 has a thrust bearing surface 10 at its top, and a radial bearing surface 11 at its periphery. Two rows of grooves 13A and 20 are formed in the bearing surface 11. Each groove 13A of the first row is a herringbone groove, whereas each groove 20 of the second row is an spiral groove. The spiral grooves 20 are located near the thrust bearing surface 10 make working fluid on the radial bearing surface 11 to flow toward the thrust bearing surface 10. Further, as shown in FIG. 4B, a number of spiral grooves 14 are formed in the thrust bearing surface 10.

Figure 5A:
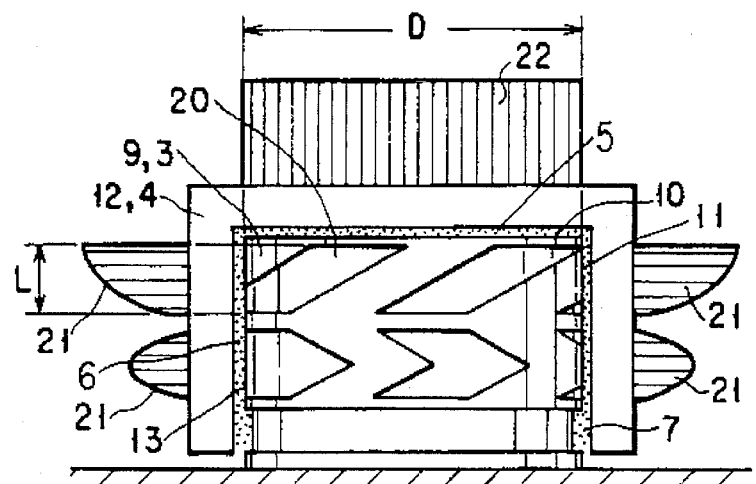
FIGS. 5A, 5B and 5C are a front view, a plan view and another front view of the first embodiment, explaining the pressure distribution in the first embodiment.
Figure 5B:
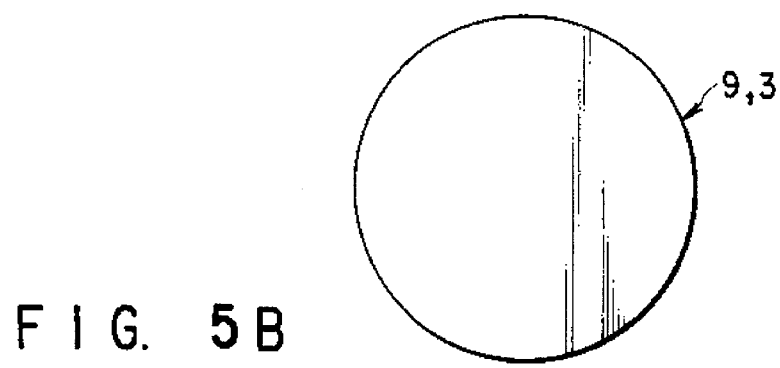

How the fluid pressure is distributed in the fluid bearing will be explained. If no spiral grooves 14 were formed in the thrust bearing surface 10 as shown in FIG. 5B, the pressure at that portion of the radial bearing surface 11 which has the spiral grooves 20 should gradually increase toward the thrust bearing surface 10, reaching the maximum value at the upper end of the shaft 9—as indicated by a shaded region 21 in FIG. 5A. On the other hand, the pressure at the thrust bearing surface 10 should be constant in the radial direction of the shaft 9, as is indicated by a shaded region 22. The pressures at the thrust bearing surface 10 and said portion of the radial bearing surface 11 should be so distributed for the following reason.

Figure 3:
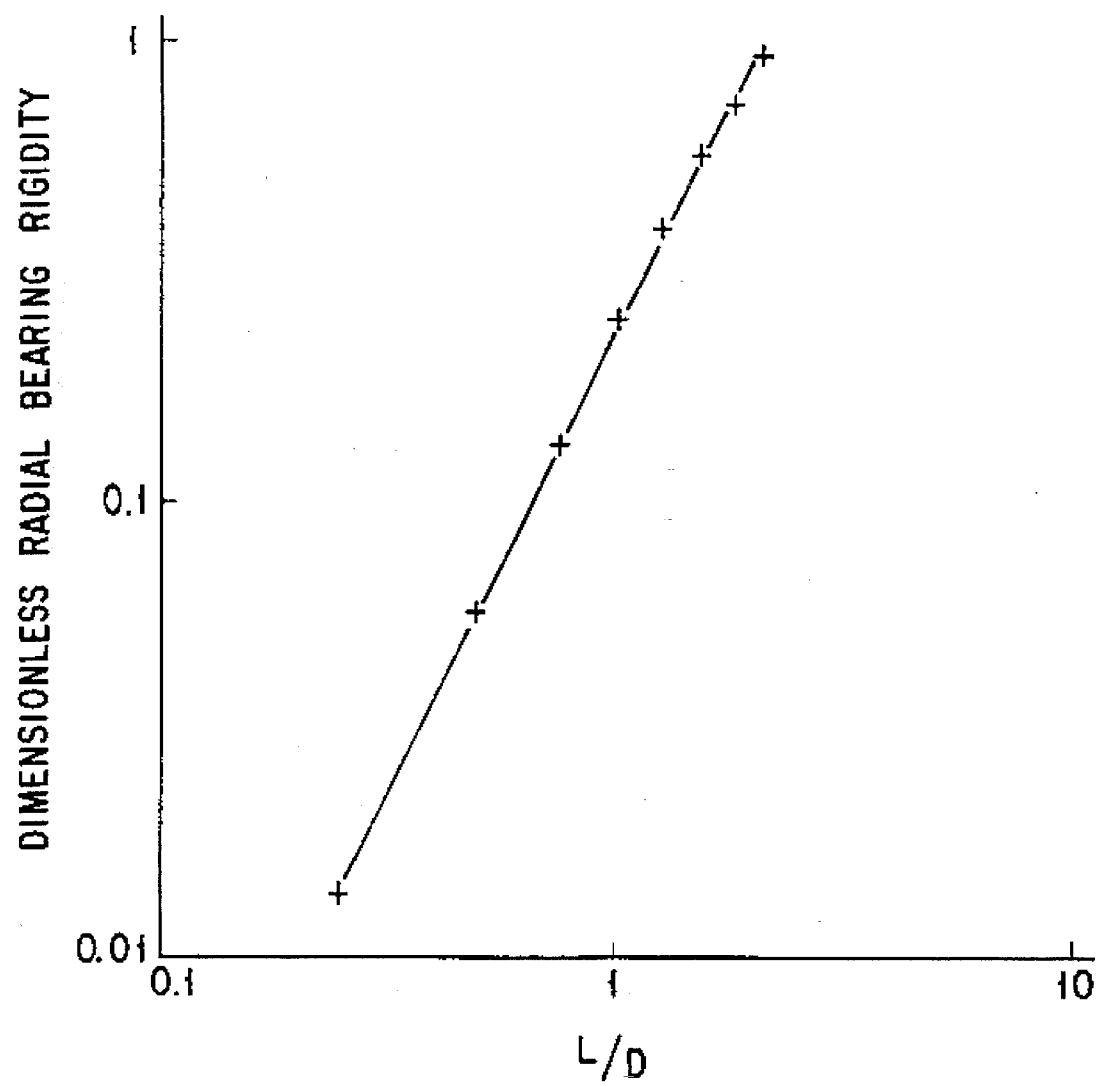
FIG. 3 is a diagram representing the relationship between the radial rigidity of the conventional fluid bearing and with the dimensionless quantity L/D thereof.
Figure 5C:
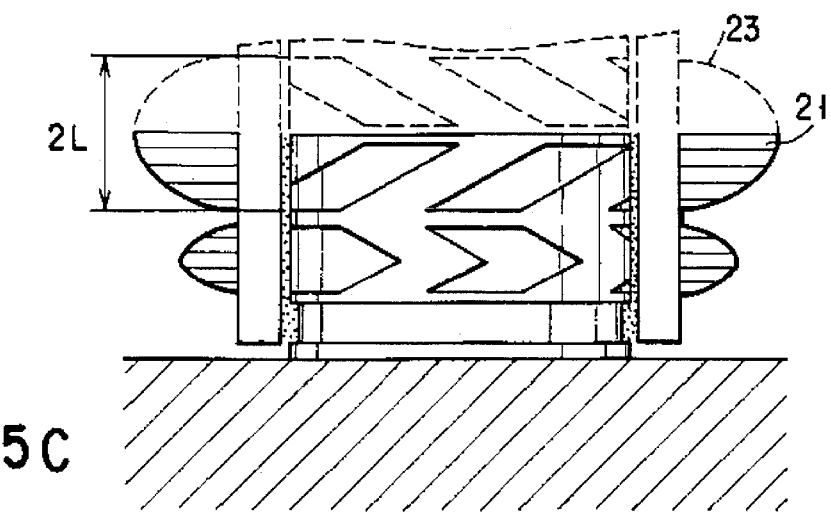

The pressure distribution 21 at that portion of the radial bearing surface 11 is the lower half of the pressure distribution 23 which would be observed if the shaft 9 (the fixed section 3) extend upward longer by the height of said portion and if herringbone grooves having a width 2L were formed in the imaginary additional upper portion of the shaft 9 as shown in FIG. 5C. In other words, the spiral grooves 20, which have a width L, serve to impart a radial rigidity twice as much since, as already indicated with reference to FIG. 3, if the width L of each groove formed in the radial bearing surface 11 is twice as much, the radial rigidity will increase four times.

By virtue of the spiral grooves 20 formed in the radial bearing surface 11 near the upper end of the shaft 9, the fluid bearing can have radial rigidity two times greater than the conventional fluid bearing, despite the herringbone grooves 13A have the same width as those the conventional fluid bearing. This helps to make the bearing thin. In addition, when incorporated in an axial-gap motor, the fluid bearing shown in FIGS. 4A and 4B has a thrust load capacitance great enough to float a cup-shaped rotary member 12 (a rotary section 4). This is because the product of the area of the thrust bearing surface 10 and the maximum pressure built up by the spiral grooves 20 overcomes the attraction of the permanent magnet of the axial-gap motor.

Since the spiral grooves 14 are formed in the thrust bearing surface 10 as shown in FIG. 4B, the pressure on that portion of the radial bearing surface 11 which has the spiral grooves 20 is distributed as illustrated by the shaded region 22 in FIG. 4A. Hence, the fluid bearing acquires not only a sufficient thrust load capacitance but also an adequate thrust rigidity. Furthermore, the cup-shaped member 12 can be positioned with high precision while the bearing is operating.

Figure 6A:
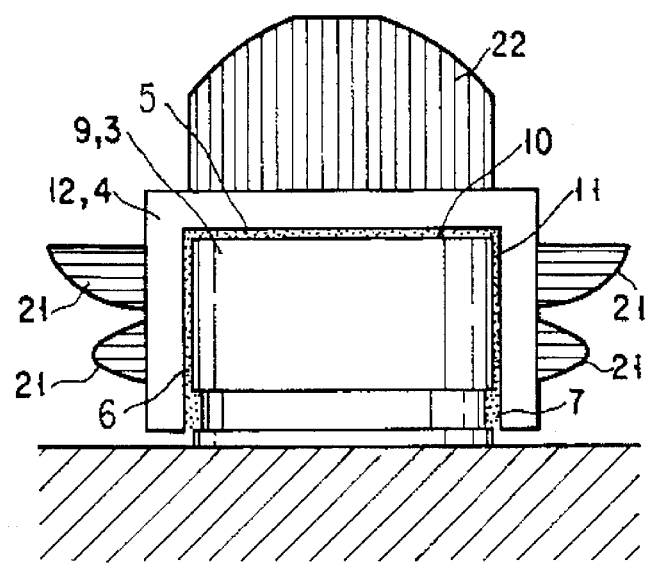
FIGS. 6A, 6B, 6C and 6D are views diagrammatically showing a fluid bearing which is a second embodiment of the present invention.
Figure 6B:
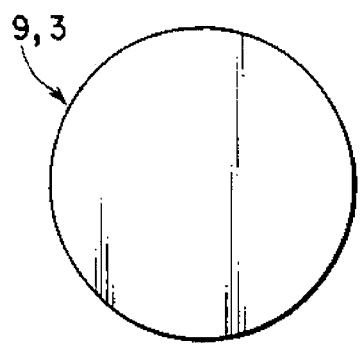
Figure 6C:
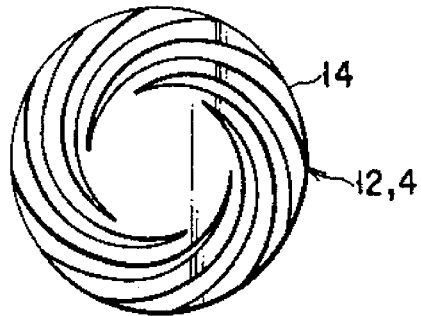
Figure 6D:
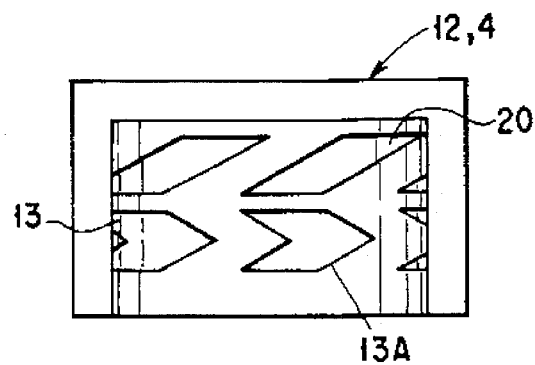

A second embodiment of the invention, which is also a fluid bearing, will be described with reference to FIGS. 6A to 6D. As shown in FIGS. 6C and 6D, herringbone grooves 13 and spiral grooves 20 are formed in the inner peripheral surface of a cup-shaped member 12 (a rotary section 4) and spiral grooves 14 are formed in the inner upper surface of the member 12, not in the thrust bearing surface 10 and radial bearing surface 11 of the shaft 9 as in the first embodiment of FIGS. 4A and 4B. The fluid bearing of the second embodiment achieves the same advantages as that of the first embodiment.

Although not shown, spiral grooves may be formed in the thrust bearing surface 10 of the shaft 9 as well, and herringbone and spiral grooves may be formed in the radial bearing surface 11 of the shaft 9 as well.

In the first and second embodiments, the herringbone grooves 13A are formed in the radial bearing surface 11 of the shaft 9 and located below the spiral grooves 20, for generating a force to prevent the shaft 9 from inclining. If such a force need not be so strong and a larger radial rigidity is required, the herringbone grooves 13A need not be formed. FIGS. 7A and 7B show a third embodiment which is also a fluid bearing and which best serves the purpose.

As shown in FIG. 7A, spiral grooves 20 are formed in the radial bearing surface 11, no herringbone grooves are formed therein. As seen from FIG. 7B, spiral grooves 14 are formed in the thrust bearing surface 10. The spiral grooves 20 can impart a radial rigidity four times greater than in the conventional fluid bearing (FIG. 3) which has two rows of herringbone grooves 13 formed in the radial bearing surface of the same width. Moreover, when incorporated in an axial-gap motor, the fluid bearing shown in FIGS. 7A and 7B has a thrust load capacitance great enough to float the cup-shaped member 12 (the rotary section 4). This is because the product of the area of the thrust bearing surface 10 and the maximum pressure built up by the spiral grooves 20 overcomes the attraction of the permanent magnet of the axial-gap motor.

FIGS. 8A and 8B show a fourth embodiment of the invention, which is also a fluid bearing. This embodiment is identical to the third embodiment (FIGS. 7A and 7B), except that herringbone grooves 24 are formed in the thrust bearing surface 10 as shown in FIGS. 8A and 8B—not spiral grooves as in the third embodiment. These herringbone grooves 24 provides such a pressure distribution as is indicated by a shaded region 25 in FIG. 8A. Thanks to these herringbone grooves 24, the fluid bearing can not only have as much radial rigidity as the second embodiment (FIGS. 6A–6D) but also reliably prevent the shaft 9 (the fixed section 3) from inclining.

In both the third embodiment and the fourth embodiment, spiral grooves 20 and herringbone grooves 24 may be formed also in the inner peripheral surface and inner upper surface of the cup-shaped member 12. In this case, the fluid bearings of the third and fourth embodiments achieve the same advantages as that of the second embodiment.

In the first to fourth embodiments described above, the spiral grooves 20 formed in the radial bearing surface 11 of the shaft 9 or the inner peripheral surface of the cup-shaped member 12 may have any shape, provided that they guide the working fluid 7 from the radial bearing surface (11) toward the thrust bearing surface (10). Their shape is not limited to those illustrated in FIGS. 4A, 5A, 5B, 6D, 7A and 8A.

When incorporated in an electric motor for use in an information apparatus, the fluid bearing according to any embodiment described above serves to render the motor small and thin. The fluid bearing can, therefore, be said to be best suited for use in a motor which is incorporated in a rotary machine such as a small-sized hard disk drive (e.g., for 1.5-inch disks or smaller disks) or a miniature card-type hard disk drive.

As described above, any one of the first to fourth embodiments, wherein spiral grooves are located at the upper portion of the radial bearing surface 11, has a radial rigidity twice as large as the conventional fluid bearing which has only herringbone grooves in the radial bearing surface of the same width. The radial bearing surface can therefore be narrowed to half the width to provide the same radial rigidity as the conventional bearing. The fluid bearing can be made far thinner than the conventional one. Furthermore, when any of the first to fourth embodiments is used in an axial-gap motor, it can acquire a thrust load capacitance large enough to float the cup-shaped member 12 since the product of the area of the thrust bearing surface and the maximum pressure built up by the spiral grooves overcomes the attraction of the permanent magnet of the motor. Thus, the first to fourth embodiments are fluid bearings which help to manufacture a small and very thin electric motor.

A fifth embodiment of the present invention, which is a disk drive, will be described with reference to FIGS. 9A and 9B. This disk drive has either the conventional fluid bearing shown in FIGS. 2A and 2B or any one of the fluid bearings according to the first to fourth embodiments of the present invention.

As illustrated in FIGS. 9A and 9B, a cup-shaped member 12 (or a rotary section 4) surrounds a shaft 9 (or a fixed section 3) such that a gap 5 is formed between the shaft 9 and the member 12. The gap 5 is filled with a working fluid such as lubricating oil. Herringbone grooves and/or spiral grooves are formed in the upper surface of the shaft 9 or the inner upper surface of the cup-shaped member 12. The shaft 9, the member 12 and the working fluid constitute a fluid bearing which has the structure shown in the structure shown in FIGS. 10A and 10B.

The bearing of FIG. 10A is identical to the third embodiment of the invention (FIGS. 7A and 7B), except that no spiral grooves are formed in the thrust bearing surface 10 (i.e., the upper surface of the shaft 9) as is illustrated in FIG. 10B.

Figure 11:
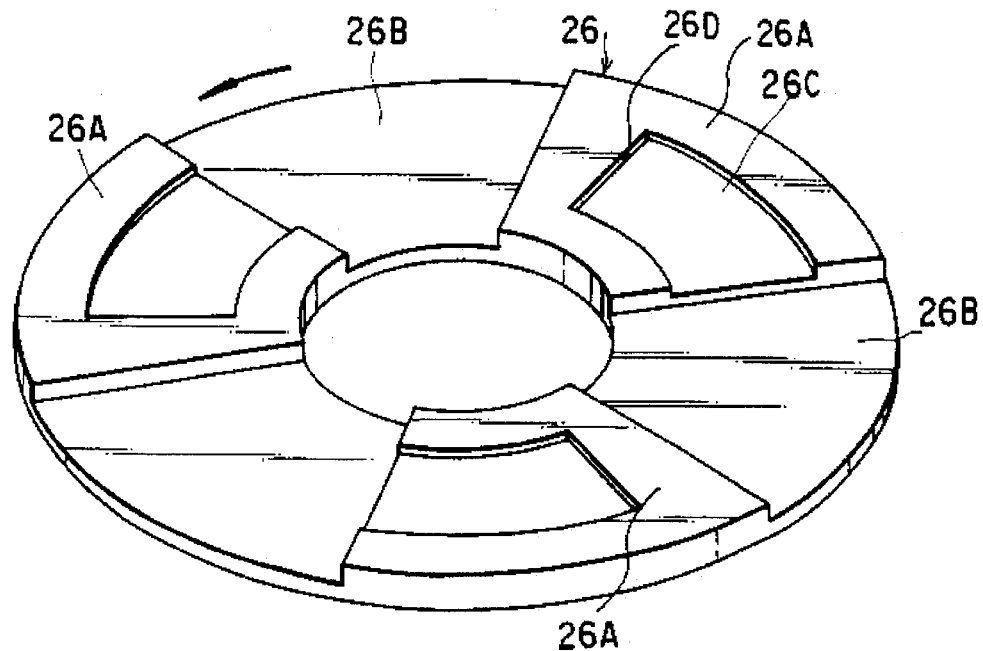
FIG. 11 is a perspective view of the support plate used in the disk drive.

Referring back to FIGS. 9A and 9B, the disk drive (i.e., the fifth embodiment of the invention) has a support plate 26 which opposes the upper surface of a disk 8. As shown in FIG. 11, the support plate 26 is a disk having a center hole and three shallow recesses 26C and three deep recesses 26B, each shaped like a Japanese fan. The deep recesses 26B are spaced apart in the circumferential direction of the plate 26, each radially extending from the center hole to the circumference of the support plate 26. The shallow recesses 26C are located between the deep recesses 26B and spaced apart in the circumferential direction of the plate 26. Each of the shallow recesses 26C extends in the circumferential direction of the plate 26, too.

At the start of the disk drive operation, the cup-shaped member 12 of the fluid bearing moves upwards, and the disk 8 connected to the member 12 also moves in the same direction. As a result, the gap between the disk 8 and the support plate 26 located above the disk 8 decreases. The air in this gap is thereby compressed, generating a dynamic pressure. This dynamic pressure imparts a thrust rigidity to the bearing and prevents the shaft 9 from inclining. The initial gap between the disk 8 and the support plate 26 is so wide that the disk 8 and the plate 26 do not contact even at the start of the disk drive operation. When the speed of the disk 8 increases to a sufficient value and the fluid bearing comes into full operation, the gap between the disk 8 and the plate 26 reduces to a desired value. Thereafter, this gap remains unchanged, and the dynamic air pressure in the gap remains constant.

The thrust bearing plate 26 will be described in detail with reference to FIG. 11. As shown in FIG. 11, the plate 26 is a disk having a center hole, three thrust bearing surfaces 26B and three deep recesses 26A. The bearing surfaces 26A are shaped like Japanese fans, extend from the center hole to the circumference of the plate 26, and are spaced apart from one another in the circumferential direction of the plate 26. The deep recesses 26B are shaped like Japanese fans and extend from the center hole to the circumference of the plate 26; they are located among the thrust bearing surfaces 26A and thus spaced apart from one another in the circumferential direction of the plate 26. Three shallow recesses 26C are formed in the bearing surfaces 26A, respectively. Each of the shallow recesses 26C is shaped like a Japanese fan, and extends in the circumferential direction of the plate 26, and has a depth of, for example, about 10 μm. The plate 26, as a whole, is rigid enough to prevent the disk from inclining to the shaft, by virtue of the air flow generated while the disk is rotating.

Each of the deep recesses 26B has a depth of, for example, about 1 mm. Each recess 26B is thus deep enough to accommodate a recording/reproducing head. Therefore, that surface of the disk which is used as bearing surface can be used as a recording surface. When the disk is rotated in the direction of the arrow shown in FIG. 11, air is made to flow into the shallow recesses 26C, and a dynamic pressure is applied in parallel to the thrust bearing surfaces 26A and in a direction perpendicular to thereto. The pressure is distributed such that it is the highest in the vicinity of the edge 26D of each shallow recess 26C. Hence, the disk is supported by virtue of the dynamic pressure, along three radial lines which are aligned with the edges of the shallow recesses 26C and which are spaced equidistantly. Generally, a disk must be supported at three points to assume any desired position. In view of this, the thrust bearing plate 26 is desirable.

In the fifth embodiment of the invention, the shaft 9 (the fixed section 3) and the cup-shaped member 12 (the rotary section 4) constitute a disk-positioning mechanism, and the support plate 26 is connected to the cup-shaped member 12 and opposes the upper surface of the disk 8. Therefore, the disk 8 does not contact the support plate 26 even at the start of the disk drive operation. Once the speed of the disk 8 has increased to a desired value, the bearing has a sufficient thrust rigidity and can prevents the shaft 9 from inclining.

Since it has a motor having a fluid bearing excelling in impact resistance, the fifth embodiment of this invention, can be very small and very thin.

Figure 12:
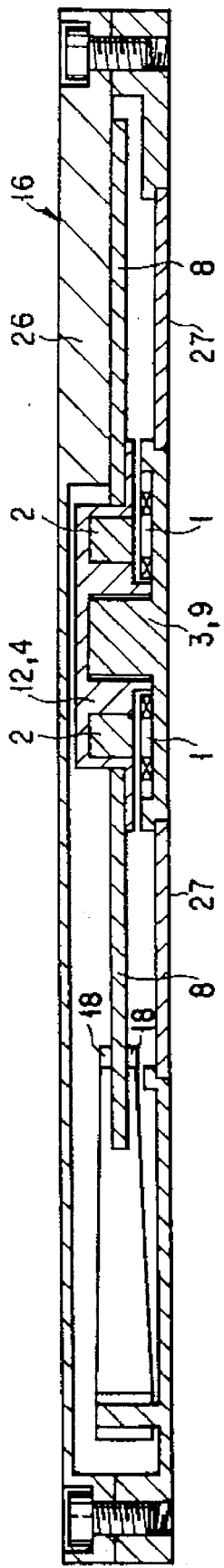
FIG. 12 is a sectional view of a disk drive which is a sixth embodiment of the present invention.

Another disk drive, which is a sixth embodiment of the present invention, will be described with reference to FIG. 12. This disk drive has an annular bimorph cell 27 for positioning a disk 8. The bimorph cell 27 connects a shaft 9 (i.e., a fixed section) to an enclosure 16. A voltage is applied to the bimorph cell 27 when the speed of the disk 8 increases to a sufficient value, whereby the bimorph cell 27 bends, reducing the thrust gap (i.e., outer thrust gap) between the disk 8 and a support plate 26. Thus, the thrust gap is maintained wide enough to prevent the disk 8 from contacting the support plate 26 at the start of the disk drive operation. Since it is unnecessary to move a cup-shaped member 12 (i.e., a rotary member) in the axial direction of the shaft 9, the fluid device incorporated in this disk drive may be composed of an ordinary radial bearing and a thrust spiral bearing or a thrust herringbone bearing.

Still another disk drive, which is a seventh embodiment of this invention, will be described with reference to FIGS. 13 and 14. This disk drive has a disk positioning device shown in FIG. 13.

Figure 13:
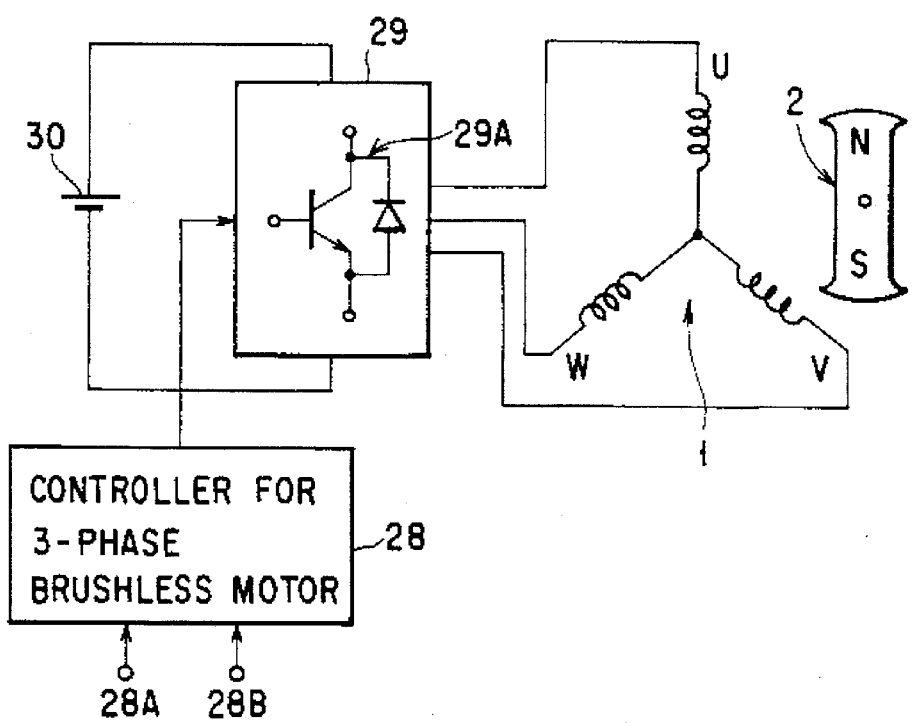
FIG. 13 is a circuit diagram showing the disk positioning device used in a disk drive according to a seventh embodiment of the present invention.
Figure 14:
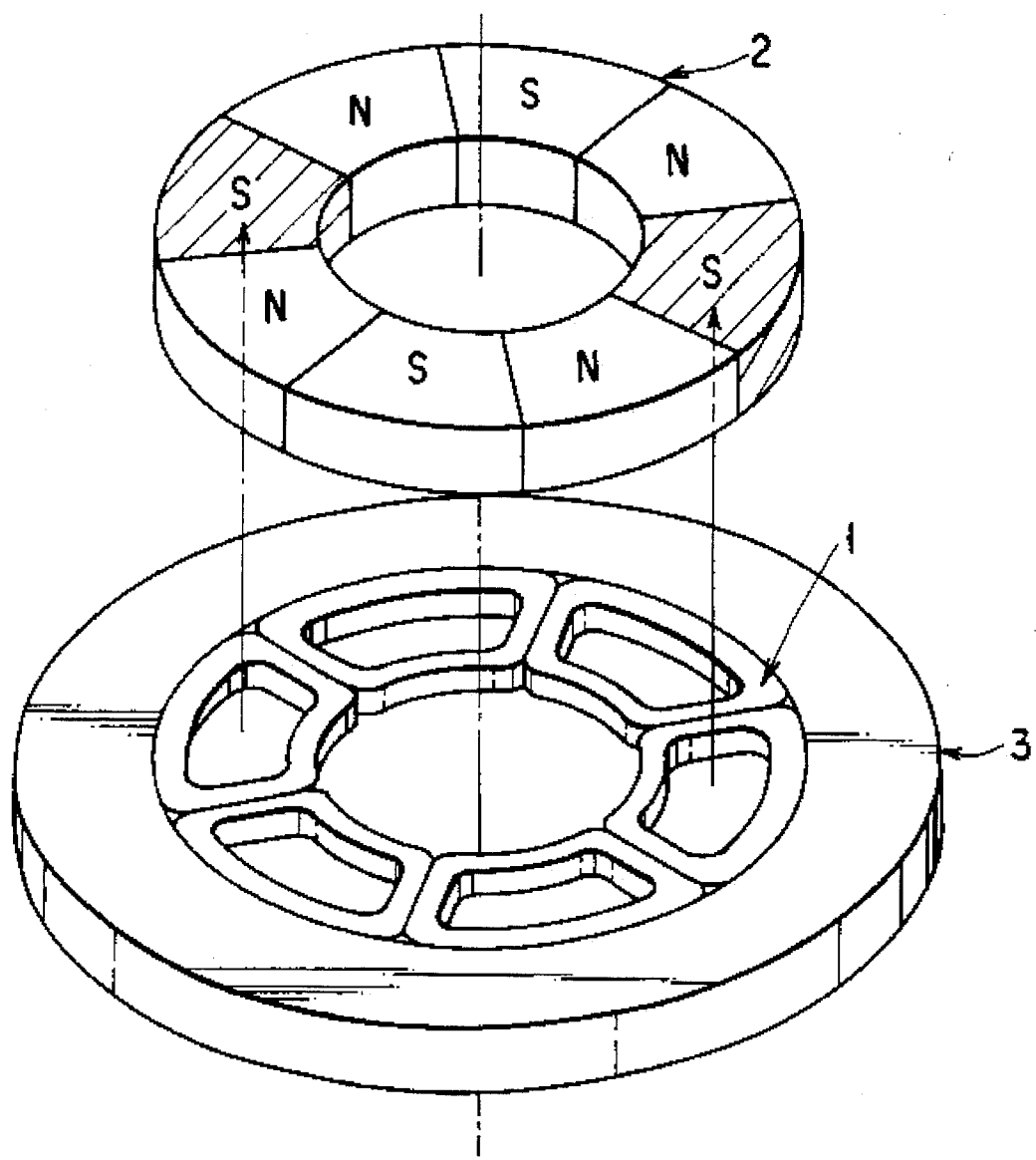
FIG. 14 is a perspective view illustrating the positional relation the three-phase armature and permanent magnet and explaining the operation of the disk drive according to the seventh embodiment of the invention.

As shown in FIG. 13, the disk positioning device comprises a three-phase brushless motor, a brushless motor controller 28, a switching circuit 29, and a DC power supply 30. The three-phase brushless motor comprises a three-phase armature 1 with 3 coil U, V, and W and a permanent magnet 2. The power supply 30 supplies a DC current to the switching circuit 29 which has a switching element 29A for driving the armature 1. The controller 28 has an ordinary-operation switch 28A and a disk-positioning switch 28B and is designed to operate the switching circuit 29, to thereby control the three-phase brushless motor.

When the ordinary-operating switch 28A is turned on, the controller 28 controls the switching circuit 29 so that the brushless motor rotates the disk 8. When both the ordinary-operating switch 28A and the disk-positioning switch 28B are turned on, the controller 28 controls the circuit 29 such that the motor not only rotates the disk 8 but also moves the disk 8 toward the support plate 26 in order to reduce the thrust gap (i.e., the outer thrust gap) between the disk 8 and the support plate 26. The principle of this disk positioning will be explained.

As mentioned above, the motor built in the disk drive, i.e., the seventh embodiment of the invention, is an axial-gap, three-phase brushless motor. Major components of the motor are the three-phase armature 1 and the permanent magnet 2. As is shown in FIG. 14 in detail, the armature 1 is a ring comprised of two sets each consisting of three coils, and the permanent magnet 2 is a ring consisting of four pairs of an S pole and an N pole, which are arranged alternately. As long as the motor is on, an electric current keeps flowing between two coils of each set, whereas no current flows through the remaining coil of each set. Hence, when a pole of the magnet 2 (whether an S pole or an N pole) fully opposes the coil of either set, through which no current is flowing, the S and N poles sandwiching this pole oppose the remaining two coils of the set, though displaced along the circumference by substantially half their width. An electric current is made to flow through the coil which the first-mentioned pole fully opposes, when the disk 8 rotated by the motor reaches a sufficiently high speed. The coil generates an electromagnetic force, which moves the disk 8 toward the support plate 26. The thrust gap (i.e., the outer thrust gap) between the disk 8 and the support plate 26. Since the thrust gap remains wide until the motor speed reaches a sufficient value, the disk 8 is prevented from contacting the support plate 26 at the start of the disk drive operation.

Figure 15:
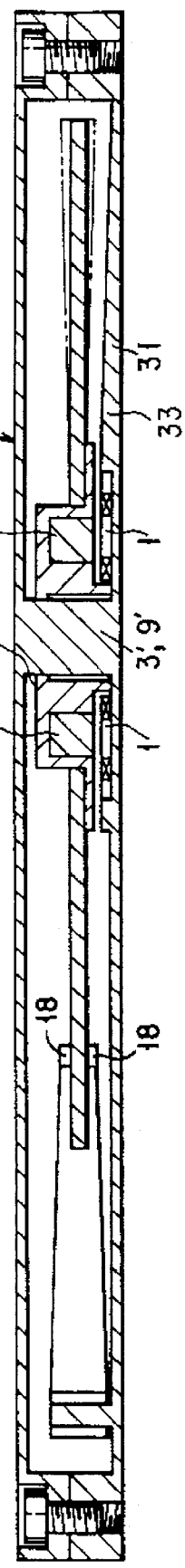
FIG. 15 is a sectional view of a disk drive which is an eighth embodiment of the present invention.

FIG. 15 shows another disk drive which is an eighth embodiment of the present invention. The disk drive is characterized by the use of an inclined support plate 31 —instead of a horizontal plate parallel to a disk 8 as in the embodiments described above. The support plate 31 is inclined because its inner portion rests on projections 33 protruding from the bottom of an enclosure 16 and located near the armature coils of a motor.

At the start of the disk drive operation, that is, when the disk 8 starts rotating, the disk 8 inclines due to its own weight, since the air pressure is not sufficient to float the disk 8 until the disk speed increases to a desired value. Nonetheless, the disk 8 does not contact the support plate 31 because the plate 31 is inclined; the disk 8 is substantially parallel to the inclining support plate 31. Once the disk speed has reached the desired value, the disk 8 extends horizontally, and the support plate 31 prevents the shaft from inclining.

Figure 17:
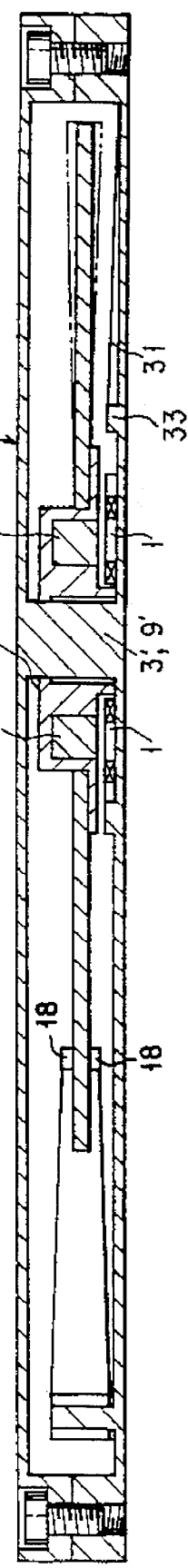
FIGS. 17 and 18 are a perspective view of another type of a support plate which may be used in the eighth embodiment.

The bearing used in this disk drive may be, needless to say, a fluid bearing which has an adequate radial rigidity and a sufficient thrust load capacity. Alternatively, it may be a fluid bearing having herringbone grooves for imparting radial rigidity only. When a fluid bearing of the latter type is used, the shaft may be a hollow one 9'(3') as shown in FIG. 17. The hollow shaft 9'(3') serves to make the enclosure 16 more rigid. Also, only one ball bearing may be employed as a center bearing unit.

Figure 18:
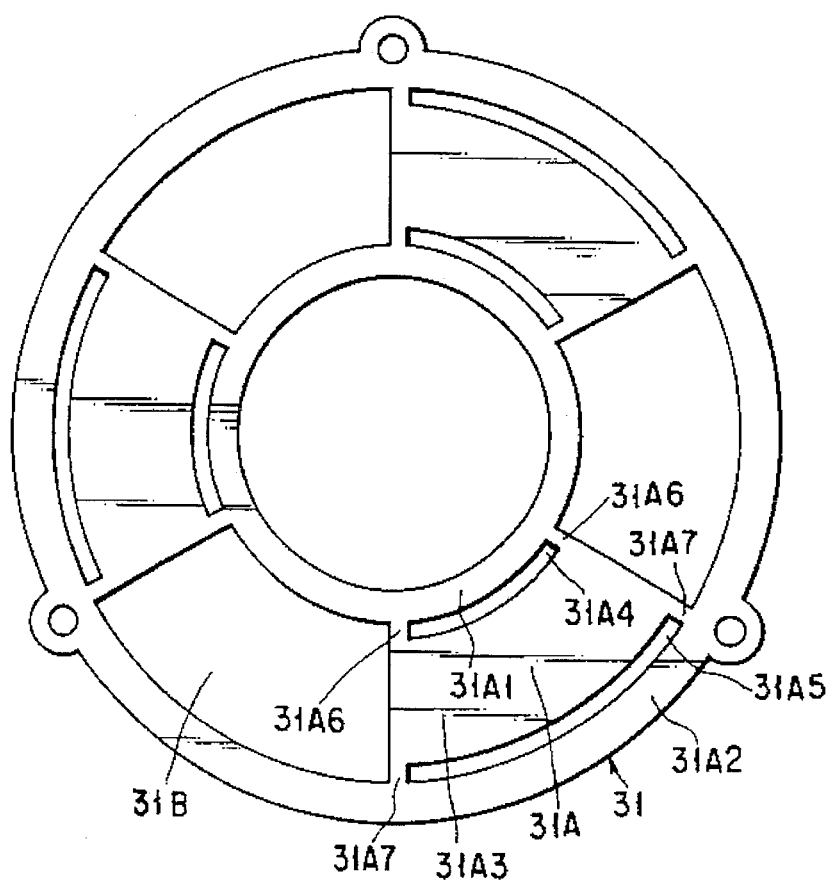

The support plate 31 will be described in detail, with reference to FIG. 18. As shown in FIG. 18, the plate 31 is a circular, flexible thin plate. It has three inclined portions 31A and three opening portions 31B which are shaped like a Japanese fan and arranged alternately.

Each inclined portion 31A has two arcuate slits 31A4 and 31A5 which define three parts 31A1, 31A2 and 31A3. The part 31A1, or the inner part, rests upon one of the projections 33 protruding from the bottom of the enclosure 16. The part 31A2, or the outer part, abuts on the inner peripheral surface of the enclosure 16. The part 31A3, or the intermediate part, functions as a bearing surface. The four parts 31A6 and 31A7 of the inclined portion 31A, which are at the ends of the slits 31A4 and 31A5, function as hinges. The hinges 31A6 and 31A7 allow the intermediate part 31A3 to warp to force the disk 8 into a horizontal position.

Figure 16:
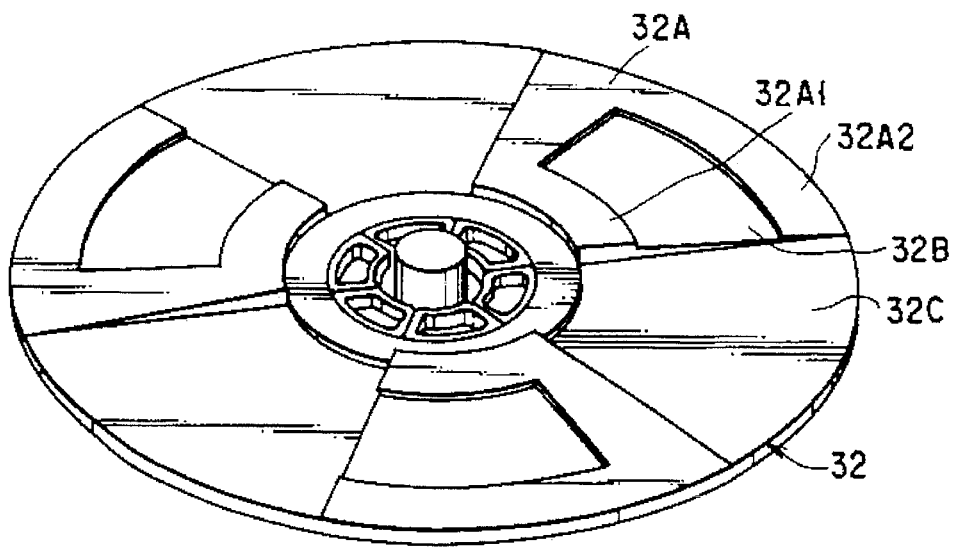
FIG. 16 is a plan view of the support plate used in the eighth embodiment.

The support plate 31 shown in FIG. 18 may be replaced by a plate shown in FIG. 16 which is a modification of the support plate 26 illustrated in FIG. 11. As shown in FIG. 16, the support plate 32 is a disk having three tapered portions 32B and three deep horizontal grooves 32C, each shaped like a Japanese fan. More precisely, each tapered portion 32A inclines downward from the inner part 32A1 to the outer portion 32A2 and has a shallow recess 32B which is shaped like a Japanese fan and which extends in the circumferential direction of the plate 32. As in the support plate 26 shown in FIG. 11, the shallow recesses 32B can generate a dynamic pressure, and the deep horizontal grooves 32C are used as spaces for accommodating magnetic recording/reproducing heads 18 as in the case of the support plate 26 illustrated in FIG. 11.

In the above-described embodiments, the disk positioning mechanism moves the disk in the axial direction of the bearing when the disk speed becomes sufficiently high. The gap between the disk and the bearing surface becomes narrow enough to build up an adequate dynamic pressure. Thus, at the start of the disk drive operation the gap between the disk and the bearing surface opposing the disk can be wider than the distance for which the disk may vibrate. There will arise no problem that the disk should contact the bearing surface.

As has been described, the present invention can provide a fluid bearing device which has a thrust load capacitance large enough for use in an axial-gap motor, which has yet an adequate radial rigidity, and which can therefore help to manufacture a very thin electric motor.

In addition, this invention can provide a disk drive apparatus which has a high-precision, impact-resistant fluid bearing and which is both small and thin.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A disk drive apparatus having a fluid bearing, comprising:

a disk which is an information recording medium;

a recording/reproducing head for recording information on said disk and reproducing information from said disk;

a disk-rotating means supporting said disk and designed to rotate said disk;

a bearing plate opposing a substantially planar surface of said disk and spaced apart from the surface of said disk by a predetermined distance while said disk is stationary said bearing plate having a thrust bearing surface; and a disk-moving mechanism for moving said disk in a direction substantially perpendicular to the surface of said disk to decrease said distance and facilitate generation of dynamic pressure between said disk and said bearing plate while said disk is rotating in close proximity to said thrust bearing surface of said bearing plate.

2. The disk drive apparatus according to claim 1, wherein said disk-moving mechanism is a bimorph device which supports said disk-rotating means and which is deformable, to thereby move said disk while said disk is rotating.

3. The disk drive apparatus according to claim 1, wherein said bearing plate has three bearing surfaces and three recesses which are alternately arranged in a circumferential direction of said disk, and at least one of said recesses accommodates said recording/reproducing head.

4. A disk drive apparatus utilizing dynamic pressure, comprising:

a disk which is an information recording medium;

a recording/reproducing head for recording information on said disk and reproducing information from said disk;

a disk-rotating means supporting said disk and designed to rotate said disk;

a bearing member opposing a substantially planar surface of said disk and spaced apart from the surface of said disk by a predetermined distance while said disk is stationary and said bearing member having a thrust bearing surface; and a disk-moving mechanism for moving said disk in a direction substantially perpendicular to the surface of said disk to decrease said distance and facilitate generation of dynamic pressure between said disk and said bearing member while said disk is rotating in close proximity to said thrust bearing surface of said bearing member.

5. The disk drive apparatus according to claim 4, wherein said disk-moving mechanism is a bimorph device which supports said disk-rotating means and which is deformable, to thereby move said disk while said disk is rotating.

6. The disk drive apparatus according to claim 4, wherein said bearing member has three bearing surfaces and three recesses which are alternately arranged in a circumferential direction of said disk and at least one of said recesses accommodates said recording/reproducing head.

7. A disk drive apparatus utilizing dynamic pressure, comprising:

a disk which is an information recording medium;

a recording/reproducing head for recording information on said disk and reproducing information from said disk;

a bearing member opposing a substantially planar surface of said disk and spaced apart from the surface of said disk by a predetermined distance while said disk is stationary, said bearing member having a first thrust bearing surface; and disk driving mechanism for rotating said disk and moving said disk in a direction substantially perpendicular to the surface of said disk to decrease said distance and facilitate generation of dynamic pressure between said disk and said bearing member while said disk is rotating in close proximity to said first thrust bearing surface of said bearing member.

8. The disk drive apparatus according to claim 7, wherein said disk driving mechanism includes a fluid bearing comprising:

a shaft having a second thrust bearing surface and a radial bearing surface;

a cup-shaped member having a first inner surface opposing the second thrust bearing surface of said shaft and second inner surface surrounding the radial bearing surface of the shaft, and supporting said disk;

a working fluid provided in a gap between said shaft and said cup-shaped member; and a first groove formed on at least one of the radial bearing surface of said shaft and the second inner surface of said cup-shaped member, for forcibly guiding said working fluid toward said second thrust surface of said shaft along said radial bearing surface thereof.

9. The disk drive apparatus according to claim 8, wherein said first groove comprises a spiral groove.

10. The disk drive apparatus according to claim 8, wherein said fluid bearing further comprises a second groove formed on at least one of the second thrust bearing surface of said shaft and the first inner surface of said cup-shaped member.

11. The disk drive apparatus according to claim 10, wherein said second groove comprises a spiral groove.

* * * * *